(12) United States Patent
Okamoto et al.

(10) Patent No.: US 10,975,936 B2
(45) Date of Patent: Apr. 13, 2021

(54) VARIABLE-SPEED ACCELERATOR AND METHOD FOR STARTING VARIABLE-SPEED ACCELERATOR

(71) Applicant: MITSUBISHI HEAVY INDUSTRIES COMPRESSOR CORPORATION, Tokyo (JP)

(72) Inventors: Yoshiyuki Okamoto, Hiroshima (JP); Masahiro Kobayashi, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 31 days.

(21) Appl. No.: 16/307,119

(22) PCT Filed: Jun. 15, 2017

(86) PCT No.: PCT/JP2017/022100
§ 371 (c)(1),
(2) Date: Dec. 4, 2018

(87) PCT Pub. No.: WO2017/217483
PCT Pub. Date: Dec. 21, 2017

(65) Prior Publication Data
US 2019/0226557 A1    Jul. 25, 2019

(30) Foreign Application Priority Data
Jun. 15, 2016 (WO) .................. PCT/JP2016/067728

(51) Int. Cl.
*F16H 3/72* (2006.01)
*H02K 7/118* (2006.01)
*F16H 37/10* (2006.01)

(52) U.S. Cl.
CPC ............... *F16H 3/728* (2013.01); *F16H 3/72* (2013.01); *H02K 7/118* (2013.01); *F16H 2037/102* (2013.01)

(58) Field of Classification Search
CPC ........... H02K 7/118; B60K 1/02; F16H 3/727; F16H 3/728; F16H 2037/102
See application file for complete search history.

(56) References Cited

U.S. PATENT DOCUMENTS 6,478,705 B1 * 11/2002 Holmes ................. B60W 10/08
475/5
6,732,526 B2 * 5/2004 Minagawa ............. B60K 6/365
180/65.235
(Continued)

FOREIGN PATENT DOCUMENTS

JP S55-145862 U 10/1980
JP S60-088254 A 5/1985
(Continued)

OTHER PUBLICATIONS

Raw translation of "Variable Electric Motor System and Electrically Powered Device" by Kobayashi Masahiro, 2016, 121 pages (Year: 2016).*

(Continued)

*Primary Examiner* — Ernesto A Suarez
*Assistant Examiner* — Lillian T Nguyen
(74) *Attorney, Agent, or Firm* — Osha Bergman Watanabe & Burton LLP

(57) ABSTRACT

A variable-speed accelerator includes: an electric device that generates a rotational driving force; and a planetary gear transmission device that changes a speed of the rotational driving force to a constant-speed input shaft and a variable-speed input shaft, and transmits the rotational driving force to a driving target via an output shaft, wherein the electric device includes a constant-speed electric motor including a constant-speed rotor that rotates the constant-speed input shaft in a second direction, and a variable-speed electric motor that includes a variable-speed rotor connected to the variable-speed input shaft, which functions as a generator in a generator mode and as an electric motor in an electric motor mode, and which rotates the output shaft at a maximum rotational speed by rotating the variable-speed rotor at the maximum rotational speed in a first direction.

9 Claims, 9 Drawing Sheets

(56) References Cited

U.S. PATENT DOCUMENTS

| | | | |
|---|---|---|---|
| 2004/0198551 A1* | 10/2004 | Joe | B60K 6/445 477/3 |
| 2005/0113201 A1 | 5/2005 | Kimura et al. | |
| 2013/0035186 A1* | 2/2013 | Martin | B60K 6/445 475/5 |
| 2013/0252773 A1* | 9/2013 | Suntharalingam | B60K 6/387 475/5 |
| 2017/0141706 A1 | 5/2017 | Kobayashi et al. | |
| 2019/0186600 A1* | 6/2019 | Miyata | H02K 9/06 |

FOREIGN PATENT DOCUMENTS

| | | |
|---|---|---|
| JP | H05-202995 A | 8/1993 |
| JP | 4472350 B2 | 6/2010 |
| JP | 2012-125126 A | 6/2012 |
| JP | 2014-031170 A | 2/2014 |
| WO | 2016/010146 A1 | 1/2016 |

OTHER PUBLICATIONS

International Search Report issued in corresponding International Application No. PCT/JP2017/022100 dated Sep. 5, 2017, with translation (4 pages).
Written Opinion of the International Searching Authority issued in corresponding International Application No. PCT/JP2017/022100 dated Sep. 5, 2017, with translation (9 pages).
International Search Report issued in corresponding International Application No. PCT/JP2016/067728 dated Sep. 13, 2016, with translation (4 pages).
Written Opinion of the International Searching Authority issued in corresponding International Application No. PCT/JP2016/067728 dated Sep. 13, 2016, with translation (7 pages).

* cited by examiner

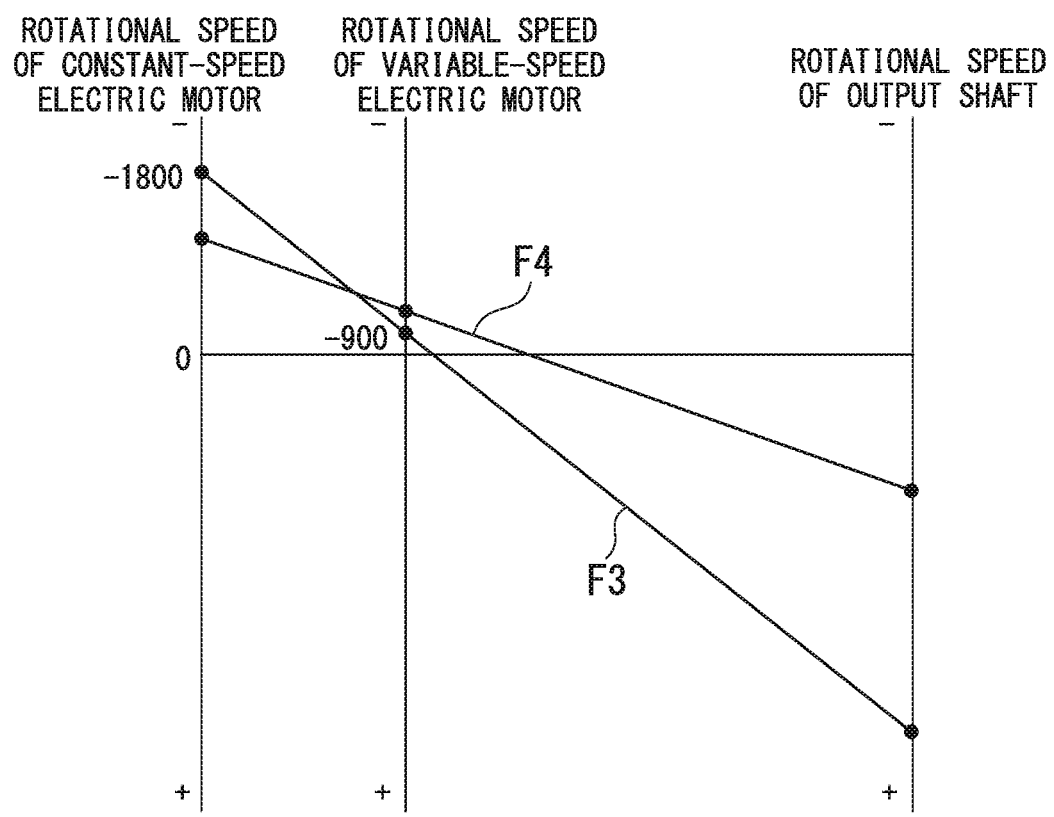

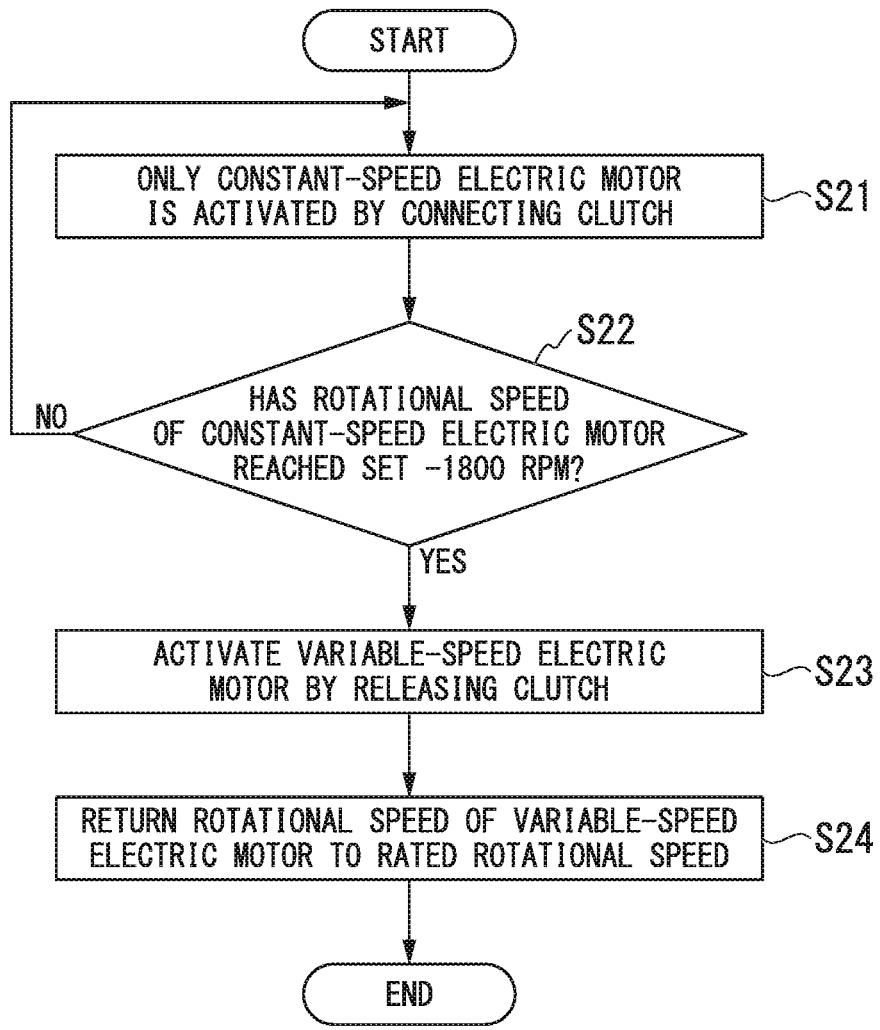

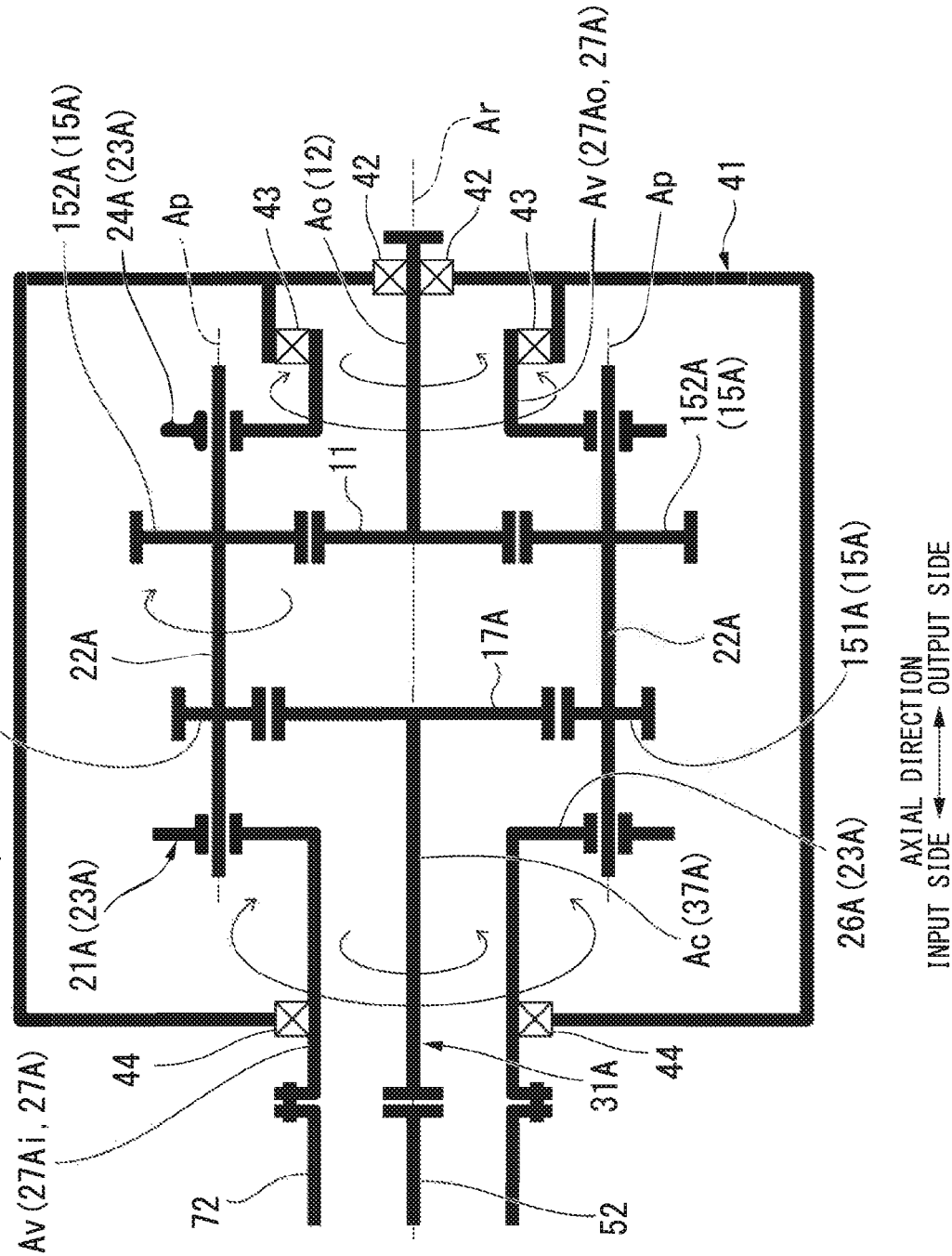

VARIABLE-SPEED ACCELERATOR AND METHOD FOR STARTING VARIABLE-SPEED ACCELERATOR

TECHNICAL FIELD

The present invention relates to a variable-speed accelerator including: an electric device including a constant-speed electric motor and a variable-speed electric motor; and a planetary gear transmission device which changes a speed of a rotational driving force generated by the electric device and transmits the rotational driving force to a driving target, and a method for starting a variable-speed accelerator.

BACKGROUND ART

As a device which drives a rotary machine, such as a compressor, there are an electric device which generates a rotational driving force and a transmission device which changes the speed of the rotational driving force generated by the electric device and transmits the rotational driving force to the rotary machine.

PTL 1 describes that a constant-speed electric motor and a variable-speed electric motor for changing the speed are used as the electric device and a planetary gear transmission device is used as the transmission device in order to accurately control a gear ratio. In the device, by changing the rotational speed of the variable-speed electric motor, it is possible to change the rotational speed of an output shaft of the transmission device connected to the rotary machine.

CITATION LIST

Patent Literature

[PTL 1] Japanese Patent No. 4472350

SUMMARY OF INVENTION

Technical Problem

Incidentally, when starting the variable-speed accelerator, depending on the specifications of the constant-speed electric motor and the variable-speed electric motor which configure the electric device, there is a problem that the starting is not smoothly performed due to the torque fluctuation at the time of starting.

The present invention provides a variable-speed accelerator including: an electric device including a constant-speed electric motor and a variable-speed electric motor; and a planetary gear transmission device which changes a speed of the rotational driving force generated by the electric device and transmits the rotational driving force to a driving target, in which it is possible to smoothly start the variable-speed accelerator.

Solution to Problem

According to a first aspect of the present invention, there is provided a variable-speed accelerator including: an electric device which is configured to generate a rotational driving force; and a planetary gear transmission device which is configured to change a speed of the rotational driving force transmitted from the electric device to a constant-speed input shaft and a variable-speed input shaft and transmits the rotational driving force to a driving target via an output shaft, in which the electric device includes a constant-speed electric motor including a constant-speed rotor which is configured to rotate the constant-speed input shaft of the planetary gear transmission device in a second direction, and a variable-speed electric motor which includes a variable-speed rotor connected to the variable-speed input shaft of the planetary gear transmission device, which functions as a generator in a generator mode, which functions as an electric motor in an electric motor mode, and which is configured to rotate the output shaft at a maximum rotational speed by rotating the variable-speed rotor at the maximum rotational speed in a first direction, and in which, in a case where the rotational speed of the variable-speed rotor in the second direction is higher than the rotational speed of the constant-speed rotor in the second direction, a clutch which is configured to transmit a driving force of the variable-speed rotor to the constant-speed rotor is provided.

According to the configuration, by transmitting the driving force of the variable-speed rotor to the constant-speed rotor, it is possible to reduce the load of the constant-speed electric motor. Accordingly, it is possible to smooth the start of the variable-speed accelerator.

In addition, even in a case where the rotational speed of the variable-speed rotor increases at the time of failure of the variable-speed electric motor, the variable-speed rotor and the constant-speed rotor are connected to each other via a one-way clutch, and accordingly, it is possible to prevent excessive rotation of the variable-speed electric motor.

According to a second aspect of the present invention, in the variable-speed accelerator, the planetary gear transmission device may include a sun gear which is configured to rotate around an axis line, a sun gear shaft which is fixed to the sun gear and extends in an axial direction around the axis line, a planetary gear which is configured to mesh with the sun gear, to revolve around the axis line, and to rotate around a center line thereof, a gear of which a plurality of teeth are arranged in an annular shape around the axis line, and which is configured to mesh with the planetary gears, a planetary gear carrier which has a planetary gear carrier shaft that extends in the axial direction around the axis line and supports the planetary gear to be capable of revolving around the axis line and to be rotatable around the center line of the planetary gear itself, and a gear carrier which has a gear carrier shaft that extends in the axial direction around the axis line and supports the gear to be rotatable around the axis line, the sun gear shaft may form the output shaft connected to the driving target, the gear carrier shaft may form a constant-speed input shaft, and the planetary gear carrier shaft may form a variable-speed input shaft, and the variable-speed rotor may be formed in a cylindrical shape around the axis line, which is connected to the variable-speed input shaft of the planetary gear transmission device, and the constant-speed input shaft may be inserted into a shaft insertion hole that penetrates the variable-speed rotor in the axial direction.

According to a third aspect of the present invention, in the variable-speed accelerator, the gear may be an internal gear, and the gear carrier shaft may be an internal gear carrier shaft.

According to a fourth aspect of the present invention, in the variable-speed accelerator, the gear may be an external gear, the gear carrier shaft may be an external gear carrier shaft, the planetary gear may include a primary gear which meshes with the external gear and a secondary gear which meshes with the sun gear, and the planetary gear carrier may coaxially support the primary gear and the secondary gear.

According to a fifth aspect of the present invention, there is provided a method for starting the variable-speed accelerator, the method including: a variable-speed electric motor activating process of activating only the variable-speed electric motor in the second direction in the electric motor mode; and a constant-speed electric motor activating process of activating the constant-speed electric motor at a stage where the rotational speed of the constant-speed rotor reaches a rated rotational speed.

According to a sixth aspect of the present invention, there is provided a method for starting a variable-speed accelerator including an electric device which is configured to generate a rotational driving force, and a planetary gear transmission device which is configured to change a speed of the rotational driving force transmitted from the electric device to a constant-speed input shaft and a variable-speed input shaft and transmits the rotational driving force to a driving target via an output shaft, in which the electric device includes a constant-speed electric motor including a constant-speed rotor which is configured to rotate the constant-speed input shaft of the planetary gear transmission device in a second direction, and a variable-speed electric motor which includes a variable-speed rotor connected to the variable-speed input shaft of the planetary gear transmission device, which functions as a generator in a generator mode, which functions as an electric motor in an electric motor mode, and which is configured to rotate the output shaft at a maximum rotational speed by rotating the variable-speed rotor at the maximum rotational speed in a first direction, and in which a clutch which is configured to transmit a driving force of the constant-speed rotor to the variable-speed rotor is provided, the method including: a constant-speed electric motor activating process of activating only the constant-speed electric motor; and a variable-speed electric motor activating process of activating the variable-speed electric motor at a stage where the constant-speed electric motor reaches a rated rotational speed.

According to the configuration, by transmitting the driving force of the constant-speed rotor to the variable-speed rotor, it is possible to reduce the load of the variable-speed electric motor. Accordingly, it is possible to smooth the start of the variable-speed accelerator.

According to a seventh aspect of the present invention, in the method for starting the variable-speed accelerator, the planetary gear transmission device may include a sun gear which is configured to rotate around an axis line, a sun gear shaft which is fixed to the sun gear and extends in an axial direction around the axis line, a planetary gear which is configured to mesh with the sun gear, to revolve around the axis line, and to rotate around a center line thereof, a gear of which a plurality of teeth are arranged in an annular shape around the axis line, and which is configured to mesh with the planetary gears, a planetary gear carrier which has a planetary gear carrier shaft that extends in the axial direction around the axis line and supports the planetary gear to be capable of revolving around the axis line and to be rotatable around the center line of the planetary gear itself, and a gear carrier which has a gear carrier shaft that extends in the axial direction around the axis line and supports the gear to be rotatable around the axis line, the sun gear shaft may form the output shaft connected to the driving target, the gear carrier shaft may form a constant-speed input shaft, and the planetary gear carrier shaft may form a variable-speed input shaft, and the variable-speed rotor may be formed in a cylindrical shape around the axis line, which is connected to the variable-speed input shaft of the planetary gear transmission device, and the constant-speed input shaft may be inserted into a shaft insertion hole that penetrates the variable-speed rotor in the axial direction.

According to an eighth aspect of the present invention, in the method for starting the variable-speed accelerator, the gear may be an internal gear, and the gear carrier shaft may be an internal gear carrier shaft.

According to a ninth aspect of the present invention, in the method for starting the variable-speed accelerator, the gear may be an external gear, the gear carrier shaft may be an external gear carrier shaft, the planetary gear may include a primary gear which meshes with the external gear and a secondary gear which meshes with the sun gear, and the planetary gear carrier may coaxially support the primary gear and the secondary gear.

Advantageous Effects of Invention

According to the present invention, by transmitting the driving force of one rotor of the constant-speed rotor and the variable-speed rotor to the other rotor, it is possible to reduce the load of the electric motor including the other rotor. Accordingly, it is possible to smooth the start of the variable-speed accelerator.

BRIEF DESCRIPTION OF DRAWINGS

FIG. 8 is a nomograph describing a method for preventing excessive rotation of the variable-speed accelerator of the first embodiment of the present invention.

FIG. 9 is a flowchart describing a method for starting a variable-speed accelerator of a second embodiment of the present invention.

FIG. 10 is a schematic view illustrating a configuration of a transmission device of a third embodiment of the present invention.

DESCRIPTION OF EMBODIMENTS

First Embodiment

Hereinafter, a variable-speed accelerator of a first embodiment of the present invention will be described in detail with reference to the drawings.

Figure 1:
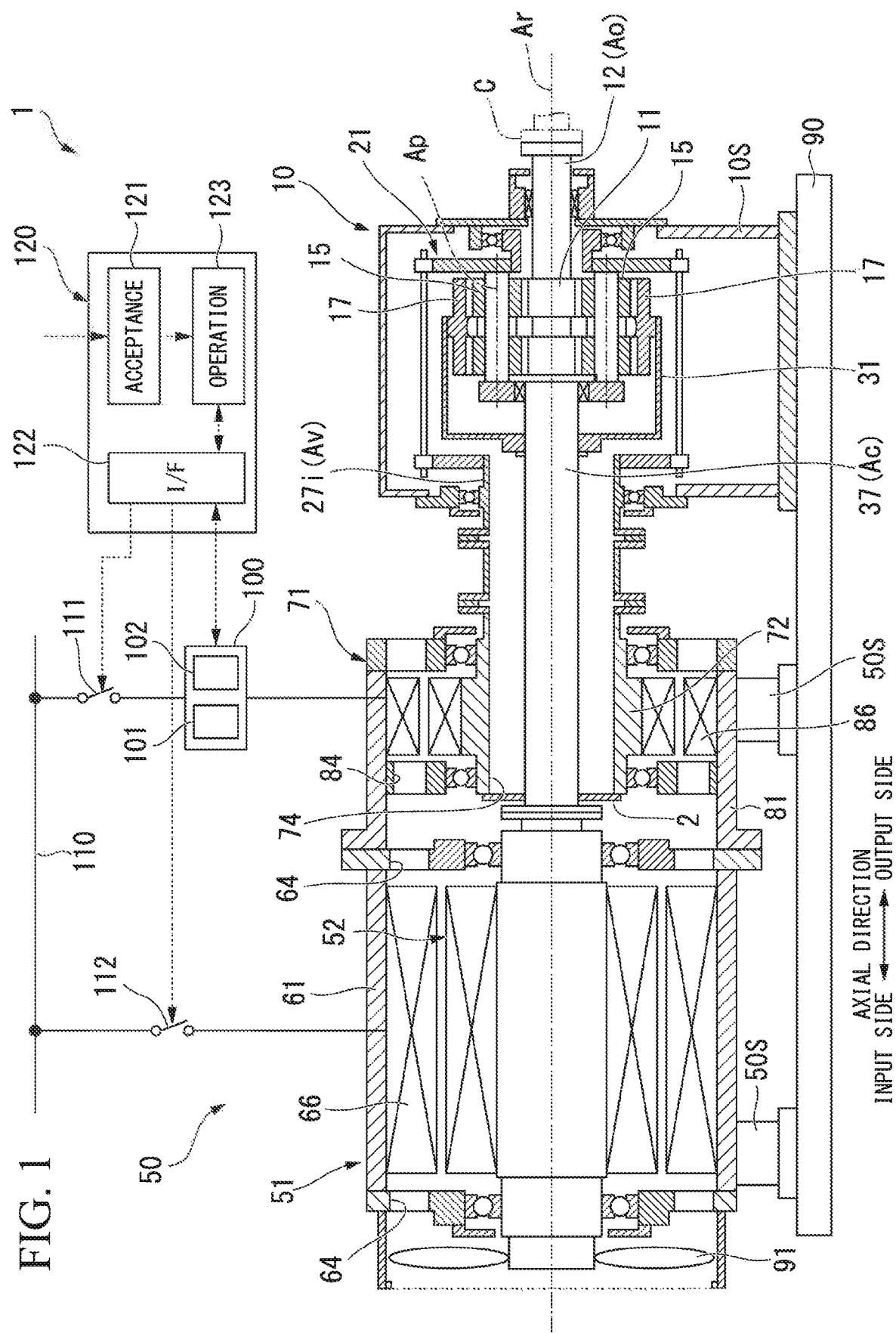
FIG. 1 is a sectional view of a variable-speed accelerator of a first embodiment of the present invention.

As illustrated in FIG. 1, a variable-speed accelerator 1 of the present embodiment includes an electric device 50 which generates a rotational driving force, and a transmission device 10 which changes the speed of the rotational driving force generated by the electric device 50 and transmits the rotational driving force to a driving target. The variable-speed accelerator 1 can be employed in, for example, a fluid mechanical system, such as a compressor system.

The driving target of the variable-speed accelerator 1 of the present embodiment is a compressor C.

The transmission device 10 is a planetary gear transmission device.

The electric device 50 includes a constant-speed electric motor 51 having a constant-speed rotor 52 which rotates at a constant speed, and a variable-speed electric motor 71 having a variable-speed rotor 72 which rotates at any rotational speed. The constant-speed rotor 52 and the variable-speed rotor 72 are both connected to the transmission device 10.

The electric device 50 is supported by a frame 90 by an electric device support unit 50S. The transmission device 10 is supported by the frame 90 by a transmission device support unit 10S. By the support units, it is possible to reliably fix the electric device 50 and the transmission device 10 which are heavy objects.

Figure 2:
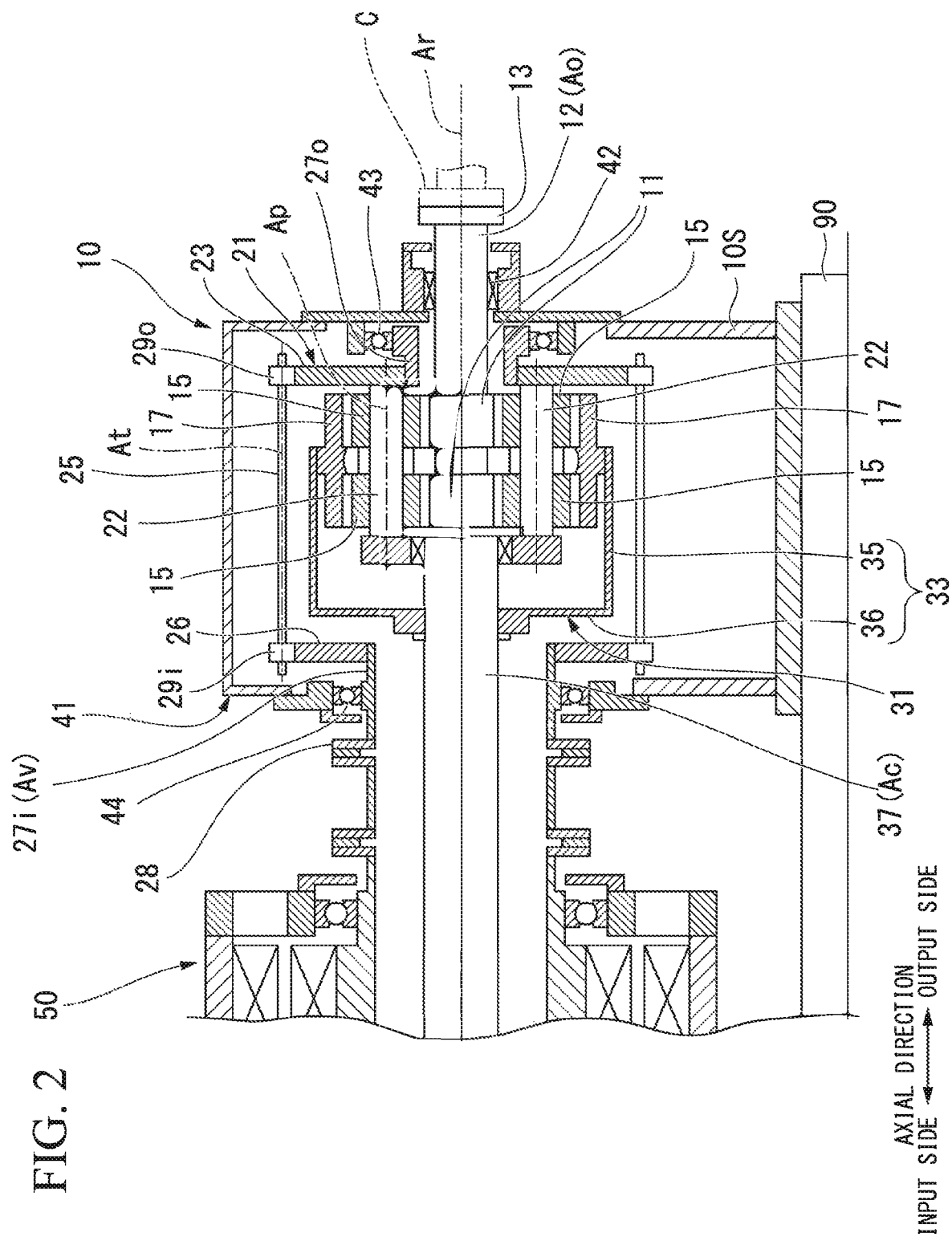
FIG. 2 is a sectional view of a transmission device of the first embodiment of the present invention.

As illustrated in FIG. 2, the transmission device 10 includes a sun gear 11 which rotates around an axis line Ar that extends in a horizontal direction, a sun gear shaft 12 which is fixed to the sun gear 11, a plurality of planetary gears 15 which mesh with the sun gear 11, revolve around the axis line Ar, and rotate around a center line Ap thereof, an internal gear (gear) 17 of which a plurality of teeth are arranged in an annular shape around the axis line Ar, and which meshes with the plurality of planetary gears 15, a planetary gear carrier 21 which supports the plurality of planetary gears 15 to be capable of revolving around the axis line Ar and rotatable around a center line Ap of the planetary gear 15 itself, an internal gear carrier (gear carrier) 31 which supports the internal gear 17 to be rotatable around the axis line Ar, and a transmission device casing 41 which covers the members.

Hereinafter, a direction in which the axis line Ar extends is an axial direction, one side in the axial direction is an output side, and the side opposite to the output side is an input side. In addition, a radial direction around the axis line Ar is simply referred to as a radial direction. In the variable-speed accelerator 1 of the present embodiment, the electric device 50 is disposed on the input side in the axis line direction, and the transmission device 10 is disposed on the output side of the electric device 50. The compressor C is disposed on the output side of the variable-speed accelerator 1.

The sun gear shaft 12 forms a columnar shape around the axis line Ar, and extends from the sun gear 11 to the output side in the axial direction. A flange 13 is formed in an output side end portion of the sun gear shaft 12. For example, a rotor of the compressor C that serves as a driving target is connected to the flange 13. The sun gear shaft 12 is supported by a sun gear bearing 42 disposed on the output side of the sun gear 11 so as to be rotatable around the axis line Ar. The sun gear bearing 42 is attached to the transmission device casing 41.

The planetary gear carrier 21 includes a planetary gear shaft 22 provided for each of the plurality of planetary gears 15, a planetary gear carrier main body 23 for fixing positions of the plurality of planetary gear shafts 22 with each other, and an output side planetary gear carrier shaft 27o which extends in the axial direction around the axis line Ar. The output side planetary gear carrier shaft 27o is fixed to an inner side in the radial direction of the planetary gear carrier main body 23.

The planetary gear shaft 22 penetrates the center line Ap of the planetary gear 15 in the axial direction and supports the planetary gear 15 so as to be rotatable around the center line thereof. The planetary gear carrier main body 23 extends radially outward from the plurality of planetary gear shafts 22.

The output side planetary gear carrier shaft 27o extends to the output side from the planetary gear carrier main body 23. The output side planetary gear carrier shaft 27o forms a cylindrical shape around the axis line Ar.

The output side planetary gear carrier shaft 27o is supported by a planetary gear carrier bearing 43 so as to be rotatable around the axis line Ar. The planetary gear carrier bearing 43 is attached to the transmission device casing 41. The sun gear shaft 12 is inserted into an inner circumferential side of the output side planetary gear carrier shaft 27o.

The transmission device 10 includes an input side planetary gear carrier shaft 27i connected to the variable-speed rotor 72 of the variable-speed electric motor 71, and a transmission device shaft 25 which transmits the rotation of the input side planetary gear carrier shaft 27i to the planetary gear carrier 21.

The input side planetary gear carrier shaft 27i forms a cylindrical shape around the axis line Ar. The input side planetary gear carrier shaft 27i is disposed on the input side of the transmission device 10, and is supported by a planetary gear carrier bearing 44 so as to be rotatable around the axis line Ar. The planetary gear carrier bearing 44 is attached to the transmission device casing 41. An internal gear carrier shaft (gear carrier shaft) 37 for driving the internal gear carrier 31 of the transmission device 10 is inserted into the inner circumferential side of the input side planetary gear carrier shaft 27i.

An annular flange 28 which widens radially outward is formed at an input side end of the input side planetary gear carrier shaft 27i. An input side arm portion 26 which extends radially outward is formed at an output side end of the input side planetary gear carrier shaft 27i.

The transmission device shaft 25 is supported so as to be rotatable around an axis line At. The transmission device shaft 25 is attached to the transmission device casing 41 via a bearing (not illustrated). At both ends of the transmission device shaft 25, an input side transmission device gear 29i and an output side transmission device gear 29o are fixed.

The input side transmission device gear 29i meshes with a gear formed at an outer circumference of the input side arm portion 26. The output side transmission device gear 29o meshes with the gear formed at the outer circumference of the planetary gear carrier main body 23. Accordingly, the rotation of the input side planetary gear carrier shaft 27i is transmitted to the planetary gear carrier 21 via the transmission device shaft 25.

The internal gear carrier 31 includes a carrier main body 33 to which the internal gear 17 is fixed, and the internal gear carrier shaft 37 which is fixed to the carrier main body 33 and extends in the axial direction around the axis line Ar.

The carrier main body 33 includes a cylinder portion 35 which forms a cylindrical shape around the axis line Ar and has the internal gear 17 fixed to the inner circumferential side thereof, and an input side arm portion 36 which extends radially inward from the input side end of the cylinder portion 35.

The internal gear carrier shaft 37 having a columnar shape around the axis line Ar is disposed on the input side of the sun gear shaft 12 having a columnar shape around the axis line Ar. The input side arm portion 36 of the carrier main body 33 is fixed to the internal gear carrier shaft 37. The internal gear carrier shaft 37 is inserted into the inner circumferential side of the cylindrical input side planetary gear carrier shaft 27i.

Figure 3:
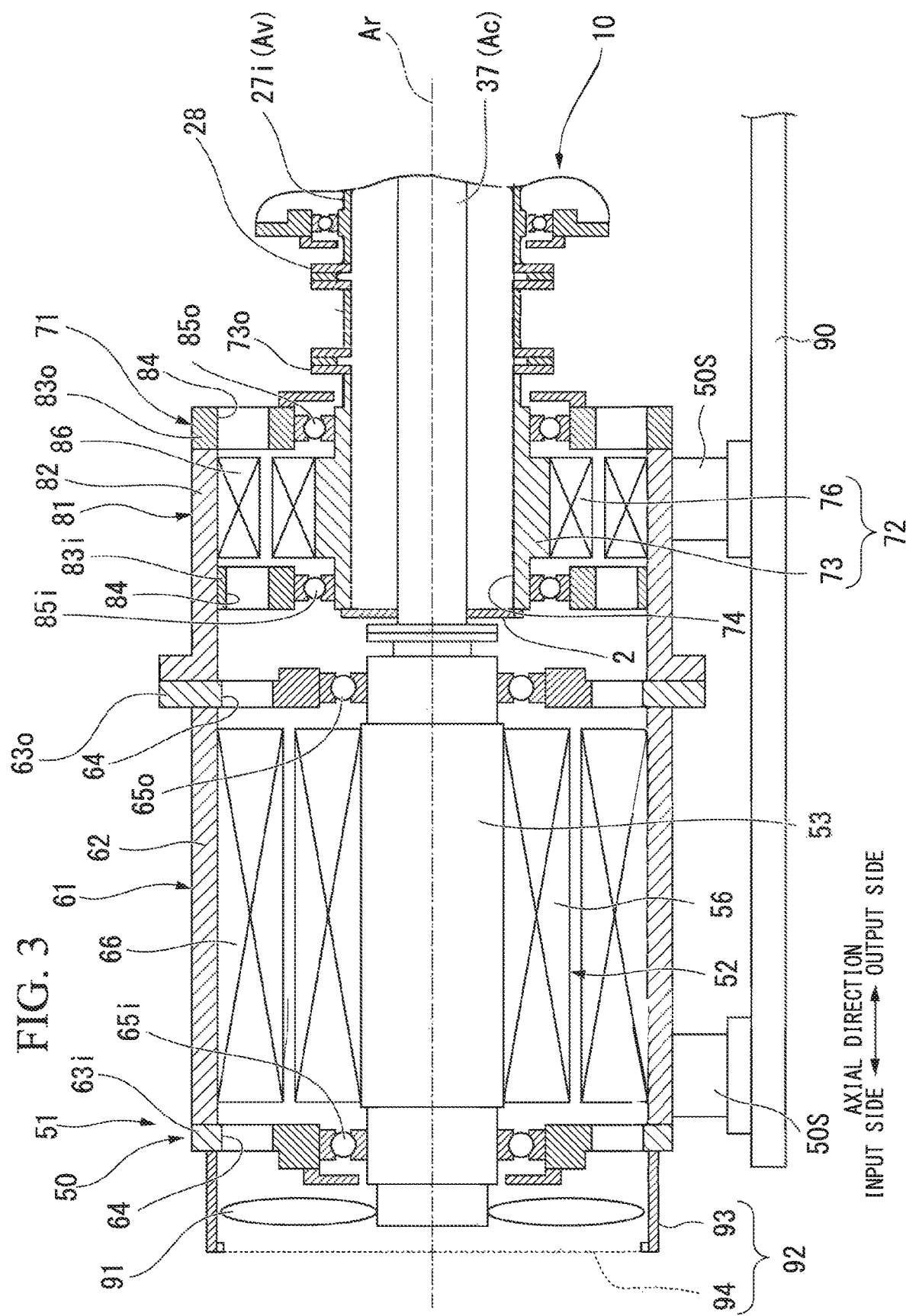
FIG. 3 is a sectional view of an electric device of the first embodiment of the present invention.

As illustrated in FIG. 3, the constant-speed electric motor 51 rotates and drives the internal gear carrier shaft 37 of the transmission device 10. The variable-speed electric motor 71 rotates and drives the input side planetary gear carrier shaft 27$i$ of the transmission device 10. The electric device 50 includes a cooling fan 91 for cooling the constant-speed electric motor 51 and a fan cover 92 which covers the cooling fan 91.

The internal gear carrier shaft 37 is a constant-speed input shaft Ac which rotates at a constant speed by a driving force of the constant-speed electric motor 51. The input side planetary gear carrier shaft 27$i$ is a variable-speed input shaft Av which rotates at any rotational speed by a driving force of the variable-speed electric motor 71.

In the variable-speed accelerator 1, by changing the rotational speed of the variable-speed electric motor 71, it is possible to change the rotational speed of an output shaft Ao of the transmission device 10 connected to the driving target.

In the present embodiment, the constant-speed electric motor 51 is, for example, a four-pole three-phase induction electric motor. In addition, the variable-speed electric motor 71 is an eight-pole three-phase induction electric motor having more poles than the constant-speed electric motor 51. In addition, the specifications of the constant-speed electric motor 51 and the variable-speed electric motor 71 are not limited thereto, and the specifications can be appropriately changed.

The constant-speed electric motor 51 includes a constant-speed rotor 52 which rotates around the axis line Ar and is connected to the internal gear carrier shaft 37 which is the constant-speed input shaft Ac of the transmission device 10, a constant-speed stator 66 which is disposed on the outer circumferential side of the constant-speed rotor 52, and a constant-speed electric motor casing 61 in which the constant-speed stator 66 is fixed to the inner circumferential side.

The constant-speed rotor 52 includes a constant-speed rotor shaft 53 which forms a columnar shape around the axis line Ar, and a conductor 56 which is fixed to the outer circumference of the constant-speed rotor shaft 53. The cooling fan 91 is fixed to the input side end of the constant-speed rotor shaft 53.

The constant-speed stator 66 is disposed on the radially outer side of the conductor 56 of the constant-speed rotor 52. The constant-speed stator 66 is formed of a plurality of coils.

The constant-speed electric motor casing 61 includes a casing main body 62 having a cylindrical shape around the axis line Ar and having a constant-speed stator 66 fixed to the inner circumferential side thereof, and lids 63$i$ and 63$o$ which block both ends of the cylindrical casing main body 62 in the axial direction. Constant-speed rotor bearings 65$i$ and 65$o$ which support the constant-speed rotor shaft 53 to be rotatable around the axis line Ar are attached to each of the lids 63$i$ and 63$o$. A plurality of openings 64 which penetrate in the axial direction are formed in each of the lids 63$i$ and 63$o$ at positions further on the radially outer side than the constant-speed rotor bearing 65$i$.

The input side end of the constant-speed rotor shaft 53 protrudes to the input side from the lid 63$i$ on the input side of the constant-speed electric motor casing 61. The cooling fan 91 is fixed to the input side end of the constant-speed rotor shaft 53.

When the constant-speed rotor 52 rotates, the cooling fan 91 also rotates integrally with the constant-speed rotor 52. The fan cover 92 includes a cylindrical cover main body 93 which is disposed on the outer circumferential side of the cooling fan 91, and an air circulating plate 94 which is attached to the opening on an inlet side of the cover main body 93 and has a plurality of air holes formed therein. The fan cover 92 is fixed to the lid 63$i$ on the input side of the constant-speed electric motor casing 61.

The variable-speed electric motor 71 includes a variable-speed rotor 72 which rotates around the axis line Ar and is connected to the input side planetary gear carrier shaft 27$i$ which is the variable-speed input shaft Av, a variable-speed stator 86 which is disposed on the outer circumferential side of the variable-speed rotor 72, and a variable-speed electric motor casing 81 to which the variable-speed stator 86 is fixed on the inner circumferential side.

The variable-speed rotor 72 includes a variable-speed rotor shaft 73 and a conductor 76 which is fixed to the outer circumference of the variable-speed rotor shaft 73. The variable-speed rotor shaft 73 has a cylindrical shape around the axis line Ar and has a shaft insertion hole 74 which penetrates the variable-speed rotor in the axial direction. The internal gear carrier shaft 37 which is the constant-speed input shaft Ac is inserted into the shaft insertion hole 74 of the variable-speed rotor shaft 73. An annular flange 73$o$ which widens radially outward is formed at the output side end of the variable-speed rotor shaft 73.

The variable-speed stator 86 is disposed on the radially outer side of the conductor 76 of the variable-speed rotor 72. The variable-speed stator 86 is formed of a plurality of coils.

The variable-speed electric motor casing 81 includes a casing main body 82 having a cylindrical shape around the axis line Ar and having the variable-speed stator 86 fixed to the inner circumferential side thereof, an output side lid 83$o$ which blocks the output side end of the cylindrical casing main body 82, and an inlet side lid 83$i$ which is disposed further on the input side than the variable-speed stator 86 and is fixed to the inner circumferential side of the cylindrical casing main body 82. Variable-speed rotor bearings 85$i$ and 85$o$ which support the variable-speed rotor shaft 73 to be rotatable around the axis line Ar are attached to each of the lids 83$i$ and 83$o$. A plurality of openings 84 which penetrate in the axial direction are formed in each of the lids 83$i$ and 83$o$ at positions further on the radially outer side than the variable-speed rotor bearings 85$i$ and 85$o$.

By the plurality of openings 84 formed in the each of lids 83$i$ and 83$o$ of the variable-speed electric motor casing 81 and the plurality of openings 64 formed in each of the lids 63$i$ and 63$o$ of the constant-speed electric motor casing 61, a space in the variable-speed electric motor casing 81 and a space in the constant-speed electric motor casing 61 communicate with each other.

Further, in the variable-speed accelerator 1 of the present embodiment, the constant-speed rotor 52, the variable-speed rotor 72, and the sun gear shaft 12 are disposed on the same axis line.

Figure 4:
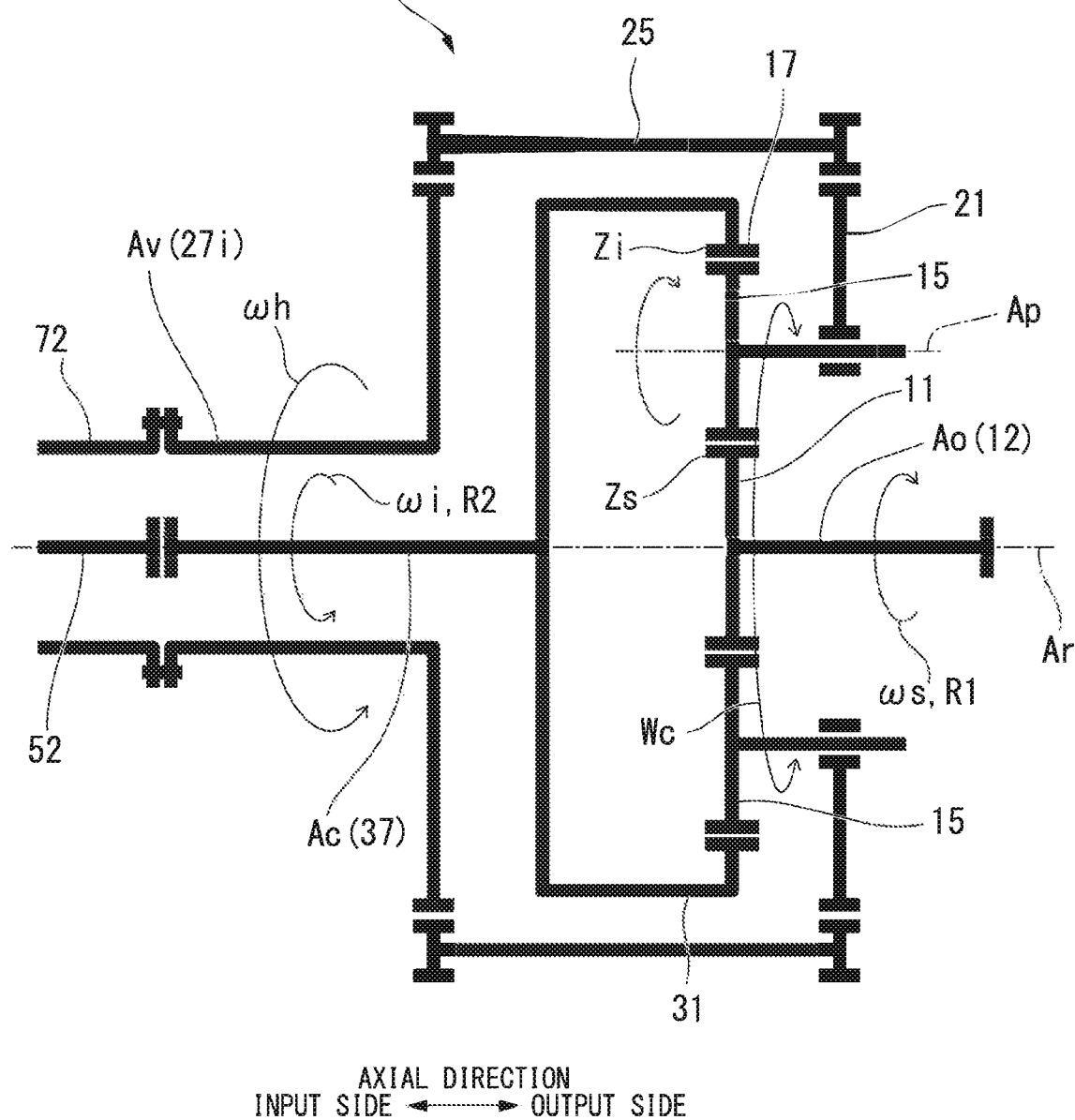
FIG. 4 is a schematic view illustrating a configuration of the transmission device of the first embodiment of the present invention.

As illustrated in FIG. 4, the constant-speed electric motor 51 is set so as to rotate the constant-speed rotor 52 (internal gear 17) in a second direction R2 in the circumferential direction of the axis line Ar by supplying electric power to the constant-speed electric motor 51. As the constant-speed rotor 52 rotates in the second direction R2, the internal gear carrier shaft 37 and the internal gear carrier 31 rotate in the second direction R2.

The output shaft Ao of the transmission device 10 is set so as to rotate in the first direction R1 reverse to the second direction R2 as the constant-speed rotor 52 of the constant-speed electric motor 51 rotates at the maximum rotational speed in the second direction R2. In other words, the forward rotation of the constant-speed electric motor 51 is performed in the second direction R2, and the forward rotation of the output shaft Ao of the transmission device 10 is performed in the first direction R1. The compressor C operates normally as the output shaft Ao rotates forward.

In addition, in the following description, the rotational direction in the first direction R1 is defined as a positive rotation direction, and the rotational direction in the second direction R2 is defined as a negative rotation direction. For example, the maximum rotational speed of the constant-speed electric motor 51 is −1800 rpm.

The variable-speed electric motor 71 can rotate and drive the variable-speed rotor 72 (planetary gear carrier 21) in the first direction R1 and in the second direction R2 in the circumferential direction of the axis line Ar. In other words, the variable-speed electric motor 71 is capable of rotating forward and reversely. By increasing the rotational speed of the variable-speed rotor 72 in the first direction R1, the rotational speed of the output shaft Ao of the transmission device 10 in the first direction R1 increases.

The variable-speed electric motor 71 functions as a generator by rotating the variable-speed rotor 72 by an external force. A state where the variable-speed electric motor 71 functions as a generator is referred to as a generator mode.

The variable-speed electric motor 71 functions as an electric motor when electric power is supplied. A state where the variable-speed electric motor 71 functions as an electric motor is referred to as an electric motor mode.

As the variable-speed rotor 72 rotates in the first direction R1, the planetary gear carrier 21 rotates in the first direction R1.

The variable-speed accelerator 1 of the present embodiment includes: a rotational speed control device 100 which controls the rotational speed of the variable-speed electric motor 71; a variable-speed electric motor switch 111 which sets the variable-speed electric motor 71 in a power supply state and in a power cut state; a constant-speed electric motor switch 112 which sets the constant-speed electric motor 51 in a power supply state and in a power cut state; and a control unit 120 which controls operations of the rotational speed control device 100, the variable-speed electric motor switch 111, and the constant-speed electric motor switch 112.

The control unit 120 is configured with a computer. The control unit 120 includes: an acceptance unit 121 which directly accepts an instruction from an operator or accepts an instruction from a host control device; an interface 122 which gives the instruction to the variable-speed electric motor switch 111, the rotational speed control device 100, and the constant-speed electric motor switch 112; and an operation unit 123 which prepares an instruction to the variable-speed electric motor switch 111, the constant-speed electric motor switch 112, and the rotational speed control device 100 in accordance with the instruction or the like accepted by the acceptance unit 121.

The variable-speed electric motor switch 111 is electrically connected to a power source line 110 and the rotational speed control device 100. The rotational speed control device 100 is electrically connected to the variable-speed electric motor 71. The constant-speed electric motor switch 112 is electrically connected to the power source line 110 and the constant-speed electric motor 51.

The variable-speed electric motor switch 111 is turned on by an ON instruction from the control unit 120, and is turned off by an OFF instruction from the control unit 120. When the variable-speed electric motor switch 111 is turned on, the electric power from the power source line 110 is supplied to the variable-speed electric motor 71 via the rotational speed control device 100, and the variable-speed electric motor 71 is in a power supply state. When the variable-speed electric motor switch 111 is turned off, the supply of the electric power from the power source line 110 to the rotational speed control device 100 and the variable-speed electric motor 71 is cut, and the variable-speed electric motor 71 is in a power cut state.

The constant-speed electric motor switch 112 is turned on by an ON instruction from the control unit 120, and is turned off by an OFF instruction from the control unit 120. When the constant-speed electric motor switch 112 is turned on, the electric power from the power source line 110 is supplied to the constant-speed electric motor 51, and the constant-speed electric motor 51 is in a power supply state. When the constant-speed electric motor switch 112 is turned off, the supply of the electric power from the power source line 110 to the constant-speed electric motor 51 is cut, and the constant-speed electric motor 51 is in a power cut state.

The rotational speed control device 100 includes a frequency conversion unit 101 which changes the frequency of electric power supplied from the power source line 110, and a rotational direction changing unit 102 which changes the rotational direction of the variable-speed electric motor 71.

The frequency conversion unit 101 supplies the electric power of the frequency instructed from the control unit 120 to the variable-speed electric motor 71. The variable-speed rotor 72 of the variable-speed electric motor 71 rotates at a rotational speed that corresponds to the frequency. In this manner, since the rotational speed of the variable-speed rotor 72 changes, the rotational speed of the planetary gear carrier 21 of the transmission device 10 connected to the variable-speed rotor 72 also changes. As a result, the rotational speed of the sun gear shaft 12 which is the output shaft Ao of the transmission device 10 also changes.

The rotational direction changing unit 102 is a device which changes the rotational direction of the variable-speed electric motor 71 by using a circuit for switching a plurality of (three in the case of the present embodiment) power source lines connected to the variable-speed electric motor 71. In other words, the rotational direction changing unit 102 can rotate the variable-speed rotor 72 forward and in reverse.

The variable-speed accelerator 1 of the present embodiment includes a clutch 2 (one-way clutch) that connects the constant-speed rotor 52 and the variable-speed rotor 72 to each other. The clutch 2 is disposed between the inner circumferential surface of the input side end portion of the variable-speed rotor 72 and the outer circumferential surface of the internal gear carrier shaft 37. In other words, the clutch 2 connects the constant-speed rotor 52 and the variable-speed rotor 72 to each other via the internal gear carrier shaft 37.

The position of the clutch 2 is not limited to the above-described position. For example, the clutch 2 may be disposed between the inner circumferential surface of the input side planetary gear carrier shaft 27i and the outer circumferential surface of the internal gear carrier shaft 37.

In a case where the rotational speed of the variable-speed rotor 72 in the second direction R2 is higher than the rotational speed of the constant-speed rotor 52 in the second direction R2, the clutch 2 transmits the driving force of the variable-speed rotor 72 to the constant-speed rotor 52. For example, when the variable-speed rotor 72 is driven in the second direction R2 in a state where the constant-speed rotor 52 is stopped, the constant-speed rotor 52 also rotates via the clutch 2. In this case, the variable-speed electric motor 71 operates in the electric motor mode.

Meanwhile, when the variable-speed rotor 72 is rotated in the first direction R1 in a state where the constant-speed rotor 52 is rotating in the second direction R2, the constant-speed rotor 52 and the variable-speed rotor 72 become free.

Here, the relationship between the number of teeth of each gear of the transmission device 10 and the rotational speed of each shaft of the transmission device 10 will be described with reference to FIG. 4.

The rotational speed of the sun gear shaft 12 that serves as the output shaft Ao is ωs, the rotational speed of the internal gear carrier shaft 37 (constant-speed electric motor 51) that serves as the constant-speed input shaft Ac is ωi, and the rotational speed of the input side planetary gear carrier shaft 27i (variable-speed electric motor 71) that serves as the variable-speed input shaft Av is ωh. In addition, the number of teeth of the sun gear 11 is Zs, and the number of teeth of the internal gear 17 is Zi.

In addition, a ratio ωs/ωi of the rotational speed ωs of the output shaft Ao to the rotational speed ωi of the constant-speed electric motor 51 is U. The ratio U of the rotational speed ωs of the output shaft Ao to the rotational speed ωi of the constant-speed electric motor 51 is the same as a ratio Zi/Zs of the number of teeth Zi of the internal gear 17 to the number of teeth Zs of the sun gear 11.

A ratio ωe/ωh of the rotational speed ωc of the planetary gear carrier 21 to the rotational speed ωh of the variable-speed electric motor 71 is P.

The relationship between the number of teeth of each of the gears and the rotational speed of each of the shafts of the transmission device 10 can be expressed by the following expression (1).

$$\omega s/\omega i = P \times \omega h/\omega i - (1 - P \times \omega h/\omega i) \times U \quad (1)$$

In a case where the constant-speed electric motor 51 is a four-pole induction electric motor and the power supply frequency is 60 Hz, the rotational speed ωi (rated rotational speed) of the constant-speed rotor 52 (constant-speed input shaft Ac) is −1800 rpm. In addition, in a case where the variable-speed electric motor 71 is an eight-pole induction electric motor and the power supply frequency is 60 Hz, the highest rotational speed ωh (rated rotational speed) of the variable-speed rotor 72 (variable-speed input shaft Av) is 900 rpm.

In addition, the ratio U of the rotational speed ωs of the output shaft Ao to the rotational speed ωi of the constant-speed electric motor 51 (the ratio Zi/Zs of the number of teeth Zs of the sun gear 11 to the number of teeth Zi of the internal gear 17) is 4. In addition, the ratio P of the rotational speed ωc of the planetary gear carrier 21 to the rotational speed ωh of the variable-speed electric motor 71 is 0.3.

In this case, when the direction of rotation of the constant-speed rotor 52 (internal gear 17) is defined as rotation in the second direction R2 (−1800 rpm) and the direction of rotation of the variable-speed rotor 72 (planetary gear carrier 21) is defined as the highest rotational speed (900 rpm) in a direction (rotation in the first direction R1) reverse to the rotation of the constant-speed rotor 52, the rotational speed ωs of the sun gear shaft 12 which is the output shaft Ao is 8500 rpm. The rotational speed (8500 rpm) is the highest rotational speed of the sun gear shaft 12.

In other words, in the transmission device 10 of the present embodiment, the internal gear 17 that corresponds to the constant-speed input shaft Ac rotates at −1800 rpm and the planetary gear carrier 21 that corresponds to the variable-speed input shaft Av rotates at 900 rpm, and accordingly, the rotational speed ωs of the output shaft Ao becomes the highest rotational speed.

When assuming that the variable speed range of the variable-speed input shaft Av is from −900 rpm to +900 rpm, as the rotational speed of the variable-speed input shaft Av approaches −900 rpm, the rotational speed ωs of the output shaft Ao is low.

In a case where the rotational speed (rated rotational speed) of the constant-speed rotor 52 is −1800 rpm and the rotational speed of the variable-speed rotor 72 is controlled in the range of −900 rpm to 900 rpm, the rotational speed of the sun gear shaft 12 which is the output shaft Ao can be controlled in the range of 5800 to 8500 rpm. The range is a variable speed range of the sun gear shaft 12 which is the output shaft Ao of the variable-speed accelerator 1, and the variable-speed accelerator 1 generally rotates the output shaft Ao within the variable speed range.

(Starting Method)

Next, a method for starting the variable-speed accelerator of the present embodiment will be described.

The method for starting a variable-speed accelerator of the present embodiment is characterized in that only the variable-speed electric motor 71 is activated and the rotational speed of the constant-speed rotor 52 of the constant-speed electric motor 51 is raised using the driving force of the variable-speed electric motor 71.

Figure 5:
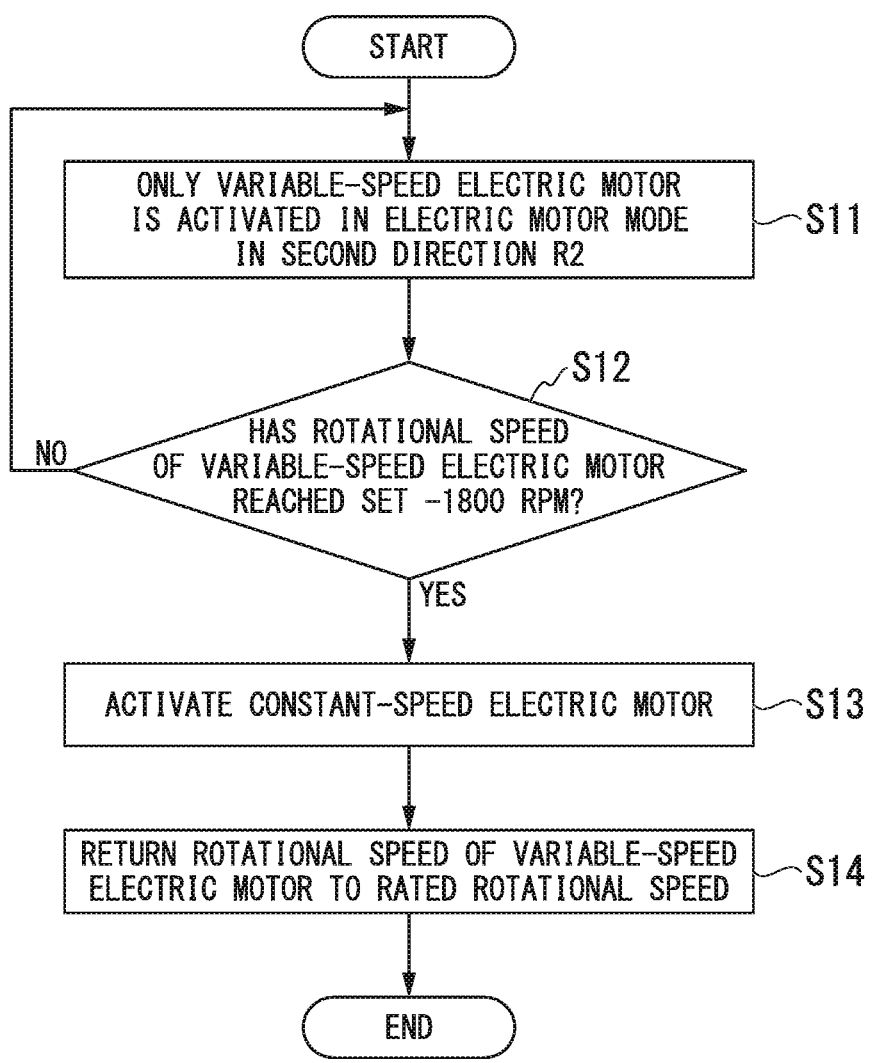
FIG. 5 is a flowchart describing a method for starting the variable-speed accelerator of the first embodiment of the present invention.

As illustrated in FIG. 5, the method of starting the variable-speed accelerator includes: a variable-speed electric motor activating process S11 of activating only the variable-speed electric motor 71 in the second direction R2 in the electric motor mode; a rotational speed monitoring process S12 of monitoring the rotational speed of the variable-speed electric motor; a constant-speed electric motor activating process S13 of activating the constant-speed electric motor 51 at a stage where the rotational speed of the constant-speed rotor 52 reaches the rated rotational speed, and shifting the variable-speed electric motor 71 from an electric motor mode to a generator mode; and a variable-speed electric motor decelerating process S14 of returning the variable-speed electric motor 71 to the rated rotational speed.

In the variable-speed electric motor activating process S11, only the variable-speed electric motor 71 is activated in the electric motor mode in the second direction R2. Since the variable-speed rotor 72 and the constant-speed rotor 52 are connected to each other by the clutch 2, the rotational speed of the constant-speed rotor 52 also increases, and the output shaft Ao is driven via the transmission device 10.

Here, the control unit 120 sets the rotational speed of the variable-speed electric motor 71 to −1800 rpm that exceeds the rated rotational speed. In the method for starting a variable-speed accelerator of the present embodiment, it is necessary to rotate the variable-speed electric motor 71 at 200% of the rated rotational speed.

Figure 6:
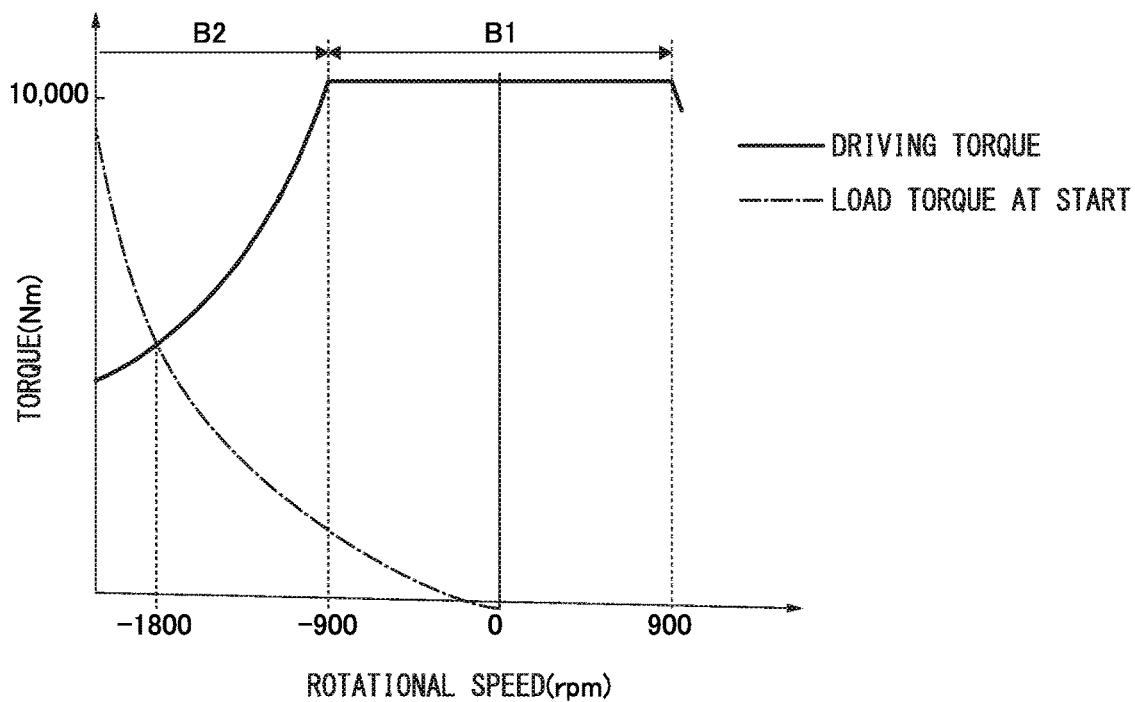
FIG. 6 is a graph describing rotational speed-torque characteristics of a variable-speed electric motor.

Here, the rotational speed-torque characteristics of the variable-speed electric motor 71 will be described. FIG. 6 is a graph describing the rotational speed-torque characteristics of the variable-speed electric motor 71. In FIG. 6, the horizontal axis represents the rotational speed (rpm) of the variable-speed electric motor 71, and the vertical axis represents the torque (Nm) of the variable-speed electric motor 71.

As indicated by the solid line in FIG. 6, a driving torque of the variable-speed electric motor 71 controlled by the control unit 120 has a constant torque range B1 and a constant output range B2. The driving torque of the variable-speed electric motor 71 indicates constant torque characteristics (constant torque range) by increasing the supply voltage from the rotational speed control device 100 in proportion to the increase in the speed of the variable-speed electric motor 71. In the variable-speed electric motor 71 of the present embodiment, the driving torque is substantially constant in the constant torque range B1 (rated rotational speed) from −900 rpm to +900 rpm.

A range beyond the driving torque of the variable-speed electric motor 71 indicates constant output characteristics in which the torque decreases, and the torque decreases (constant output range B2).

A load torque at the start of the variable-speed electric motor 71 increases as the rotational speed increases, as indicated by the broken line in FIG. 6. Here, the load torque in the variable-speed electric motor 71 of the present embodiment is a torque required for the variable-speed electric motor 71 to drive the constant-speed electric motor 51 and the compressor C via the clutch 2.

In other words, the variable-speed electric motor 71 can drive the constant-speed electric motor 51 in a range where the driving torque exceeds the load torque even when the range is out of the rated rotational speed range (out of the constant torque range). As illustrated in FIG. 6, the driving torque of the variable-speed electric motor 71 according to the present embodiment exceeds the load torque when an absolute value of the rotational speed is equal to or less than 1800 rpm even in the constant output range B1 which is out of the rated rotational speed range.

Accordingly, it is ascertained that the variable-speed electric motor 71 of the present embodiment can speed up the constant-speed electric motor 51 to −1800 rpm through the clutch 2 even at the rotational speed that exceeds the rated rotational speed (constant torque range B1).

In the rotational speed monitoring process S12, the control unit 120 determines whether or not the rotational speed of the variable-speed electric motor 71 has reached the set −1800 rpm. In a case where the rotational speed of the variable-speed electric motor 71 has not reached the set −1800 rpm, the rotational speed of the variable-speed electric motor 71 is further raised. In a case where the rotational speed of the variable-speed electric motor 71 reaches −1800 rpm, the process moves to the constant-speed electric motor activating process S13.

The rotational speed of the variable-speed electric motor 71 becomes −1800 rpm, and accordingly, the rotational speed of the constant-speed electric motor also becomes −1800 rpm (the rated rotational speed of the constant-speed electric motor).

Figure 7:
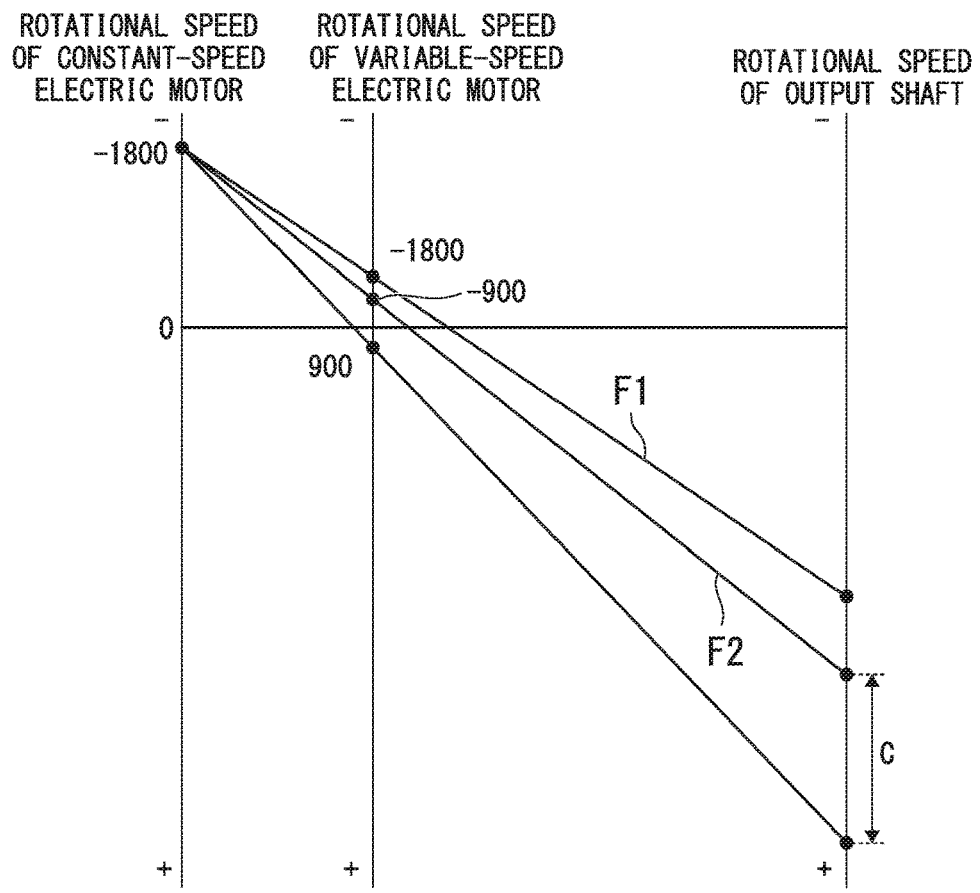
FIG. 7 is a nomograph describing the method for starting the variable-speed accelerator of the first embodiment of the present invention.

In the description using a nomograph illustrated in FIG. 7, the rotational speed of the variable-speed electric motor 71 and the constant-speed electric motor 51 becomes −1800 rpm, and accordingly, the operating points of the constant-speed rotor 52, the variable-speed rotor 72, and the output shaft Ao are placed in a state indicated by a straight line F1. According to the nomograph of FIG. 7, the rotational speed of the output shaft Ao is lower than the minimum rotational speed of the variable speed range c.

In the constant-speed electric motor activating process S13, the control unit 120 activates the constant-speed electric motor 51 to continue the operation of the constant-speed electric motor 51. Accordingly, the constant-speed electric motor 51 continues to rotate and drive at −1800 rpm regardless of the rotational speed of the variable-speed electric motor 71.

In the variable-speed electric motor decelerating process S14, the control unit 120 returns the rotational speed of the variable-speed electric motor 71 to the rated rotational speed. Accordingly, the variable-speed electric motor 71 shifts from the electric motor mode to the generator mode, and the driving force of the variable-speed electric motor 71 is not transmitted to the constant-speed rotor 52 via the clutch 2. In other words, only the variable-speed electric motor 71 decelerates.

The rotational speed of the output shaft Ao reaches the minimum rotational speed of the variable speed range c by decelerating the rotational speed of the variable-speed rotor 72. When the rotational speed of the constant-speed electric motor 51 is −1800 rpm and the rotational speed of the variable-speed electric motor 71 is −900 rpm, the operating points of the constant-speed rotor 52, the variable-speed rotor 72, and the output shaft Ao are placed in a state indicated by a straight line F2.

Thereafter, by changing the rotational speed of the variable-speed electric motor 71 from −100% (−900 rpm) to +100% (900 rpm), the output shaft Ao can be operated at a variable speed in the variable speed range c.

(Method for Preventing Excessive Rotation)

Next, a method for preventing excessive rotation of the variable-speed accelerator of the present embodiment will be described.

The variable-speed accelerator 1 of the present embodiment has a function of preventing excessive rotation of the variable-speed electric motor 71, for example, at the time of failure of the frequency conversion unit 101 (inverter) of the rotational speed control device 100.

It is assumed that the variable-speed electric motor 71 is operating at 100% of the rotational speed (−900 rpm) in the second direction R2, for example. In the description using a nomograph illustrated in FIG. 8, the operating points of the constant-speed rotor 52, the variable-speed rotor 72, and the output shaft Ao are placed in a state indicated by a straight line F3.

During the operation of the variable-speed electric motor 71, in a case where the frequency conversion unit 101 fails, the variable-speed electric motor 71 freely runs in the second direction R2 and tries to exceed the rated rotational speed.

Meanwhile, the output shaft Ao and the constant-speed rotor 52 decelerate. In the description using a nomograph illustrated in FIG. 8, the operating points of the constant-speed rotor 52, the variable-speed rotor 72, and the output shaft Ao are placed in a state indicated by a straight line F4.

At the time when the constant-speed rotor 52 and the variable-speed rotor 72 have reached the same speed, the constant-speed rotor 52 and the variable-speed rotor 72 are connected to each other via the clutch 2. At this time, since the variable-speed rotor 72 is in the accelerating direction and the constant-speed rotor 52 is in the decelerating direction, the constant-speed rotor 52 and the variable-speed rotor 72 which are connected to each other decelerate at the same speed. Here, since inertia of the constant-speed rotor 52 is greater than that of the variable-speed rotor, the variable-speed rotor 72 is decelerated following the constant-speed rotor 52. In other words, the variable-speed electric motor 71 never exceeds 200% and does not excessively rotate.

According to the above-described embodiment, by transmitting the driving force of the variable-speed rotor 72 to the constant-speed rotor 52, it is possible to reduce the load of the constant-speed electric motor 51 including the constant-speed rotor 52. Accordingly, it is possible to smooth the start of the variable-speed accelerator 1.

Further, by using the variable-speed electric motor 71 having a smaller capacity than that of the constant-speed electric motor 51, the rotational speed of the constant-speed electric motor 51 can be increased to the rated rotational speed. Accordingly, there is no need to design the starting current and the starting torque of the constant-speed electric motor 51 in consideration of the load.

In addition, it is possible to perform a soft start of the constant-speed electric motor 51.

In addition, a soft starter and a bypass switch gear for activating the constant-speed electric motor 51 become unnecessary.

In addition, in a case where a synchronous electric motor is used for the constant-speed electric motor 51, damper coupling becomes unnecessary.

In addition, even in a case where the rotational speed of the variable-speed rotor 72 increases at the time of failure of the variable-speed electric motor 71, the variable-speed rotor 72 and the constant-speed rotor 52 are connected to each other via the clutch 2, and accordingly, it is possible to prevent excessive rotation of the variable-speed electric motor 71.

In addition, in the present embodiment, the internal gear carrier shaft 37 which is a rod-shaped shaft is inserted into the variable-speed rotor shaft 73 which is a cylindrical shaft formed with the shaft insertion hole 74. In other words, the constant-speed input shaft Ac having a large output is inserted into the variable-speed rotor shaft 73 of the variable-speed electric motor 71 having a smaller output than that of the constant-speed electric motor 51. Accordingly, it is possible to adopt a constant-speed electric motor 51 having a larger output (horsepower).

Further, in the present embodiment, since the constant-speed electric motor 51, the variable-speed electric motor 71, the transmission device, and the compressor C are linearly arranged in that order, the whole device can be made more compact.

In addition, in the above-described embodiment, a four-pole three-phase induction electric motor is exemplified as the constant-speed electric motor 51 appropriate for rotating the compressor C at a high speed, and an eight-pole three-phase induction electric motor is exemplified as the variable-speed electric motor 71 appropriate for variably changing the rotational speed of the compressor C within a certain range. However, in a case where it is not necessary to rotate the driving target at a high speed, other types of electric motors may be used as the constant-speed electric motor 51 or the variable-speed electric motor 71.

Second Embodiment

Hereinafter, a variable-speed accelerator of a second embodiment of the present invention will be described in detail. In addition, in the present embodiment, differences from the above-described first embodiment will be mainly described, and the description of similar parts will be omitted.

The clutch 2 of the present embodiment is configured to transmit the driving force of the constant-speed rotor 52 to the variable-speed rotor 72. For example, when the constant-speed rotor 52 is driven in the second direction R2 in a state where the variable-speed rotor 72 is stopped, the variable-speed rotor 72 also rotates via the clutch 2.

(Starting Method)

Next, a method for starting the variable-speed accelerator of the present embodiment will be described.

The method for starting a variable-speed accelerator of the present embodiment is characterized in that only the constant-speed electric motor 51 is activated and the rotational speed of the variable-speed rotor 72 of the variable-speed electric motor 71 is raised using the driving force of the constant-speed electric motor 51.

As illustrated in FIG. 9, the method for starting the variable-speed accelerator includes: a constant-speed electric motor activating process S21 of activating only the constant-speed electric motor 51 by connecting the clutch 2 thereto; a rotational speed monitoring process S22 of monitoring the rotational speed of the constant-speed electric motor 51; a variable-speed electric motor activating process S23 of activating the variable-speed electric motor 71 by releasing the clutch 2 at a stage where the constant-speed electric motor 51 has reached the rated rotational speed; and a variable-speed electric motor decelerating process S24 of returning the variable-speed electric motor 71 to the rated rotational speed.

In the constant-speed electric motor activating process S21, only the constant-speed electric motor 51 is activated in a state where the clutch 2 is connected thereto. Since the variable-speed rotor 72 and the constant-speed rotor 52 are connected to each other by the clutch 2, the rotational speed of the variable-speed rotor 72 also increases, and the output shaft Ao is driven via the transmission device 10.

In the rotational speed monitoring process S22, the control unit 120 determines whether or not the rotational speed of the constant-speed electric motor 51 has reached −1800 rpm. In a case where the rotational speed of the constant-speed electric motor 51 reaches −1800 rpm, the process moves to the variable-speed electric motor activating process S23.

The rotational speed of the constant-speed electric motor 51 becomes −1800 rpm, and accordingly, the rotational speed of the variable-speed electric motor 71 also becomes −1800 rpm.

In the variable-speed electric motor activating process S23, the control unit 120 releases the clutch 2 and activates the variable-speed electric motor 71.

In the variable-speed electric motor decelerating process S24, the control unit 120 returns the rotational speed of the variable-speed electric motor 71 to the rated rotational speed. In other words, only the variable-speed electric motor 71 decelerates.

Thereafter, by changing the rotational speed of the variable-speed electric motor from −100% (−900 rpm) to +100% (900 rpm), the output shaft can be operated at a variable speed in the variable speed range.

According to the embodiment, by transmitting the driving force of the constant-speed rotor 52 to the variable-speed rotor 72, it is possible to reduce the load of the variable-speed electric motor 71. Accordingly, it is possible to smooth the start of the variable-speed accelerator 1.

Third Embodiment

Next, with reference to FIG. 10, a transmission device 10A of a third embodiment will be described.

In the third embodiment, the same configuration elements as those of the first and second embodiments are denoted by the same reference numerals, and the detailed description thereof will be omitted. The internal structure of the transmission device 10A of the third embodiment is different from that of the first embodiment.

In the transmission device 10A of the third embodiment, the gear which was the internal gear in the first embodiment is the external gear. Therefore, the gear carrier shaft which was the internal gear carrier shaft in the first embodiment is the external gear carrier shaft.

Specifically, as illustrated in FIG. 10, the transmission device 10A of the third embodiment includes the sun gear 11, the sun gear shaft 12, a planetary gear 15A, an external gear (gear) 17A, a planetary gear carrier 21A, an external gear carrier (gear carrier) 31A, and the transmission device casing 41 which covers the members.

The planetary gear 15A of the third embodiment includes a plurality of first planetary gears (primary gears) 151A and a plurality of second planetary gears (secondary gears) 152A.

The first planetary gear 151A meshes with the external gear 17A. The first planetary gear 151A revolves around the axis line Ar and also rotates around the center line Ap thereof.

The second planetary gear 152A meshes with the sun gear 11. The second planetary gear 152A revolves around the axis line Ar and also rotates around the center line Ap thereof similar to the first planetary gear 151A. The second planetary gear 152A is disposed further on the output side in the axial direction than the first planetary gear 151A. One of the second planetary gears 152A is rotatable integrally with one of the first planetary gears 151A. In other words, one first planetary gear 151A is disposed in a pair with respect to one second planetary gear 152A.

The planetary gear carrier 21A of the third embodiment includes a planetary gear shaft 22A, a planetary gear carrier main body 23A, and a planetary gear carrier shaft 27A.

The planetary gear shaft 22A is provided for each of the plurality of planetary gears 15A. The planetary gear shaft 22A allows the first planetary gear 151A and the second planetary gear 152A which are connected to each other around the center line Ap to be rotatable. The planetary gear shaft 22A connects one second planetary gear 152A to one first planetary gear 151A. Specifically, the first planetary gear 151A is connected to the input side in the axial direction of the planetary gear shaft 22A, and the second planetary gear 152A is connected to the output side in the axial direction of the planetary gear shaft 22A. The planetary gear shaft 22A penetrates the first planetary gear 151A and the second planetary gear 152A in the axial direction. Therefore, an end portion on the input side in the axial direction of the planetary gear shaft 22A is positioned further on the input side in the axial direction than the first planetary gear 151A. In addition, an end portion on the output side in the axial direction of the planetary gear shaft 22A is positioned further on the output side in the axial direction than the second planetary gear 152A.

The planetary gear carrier main body 23A fixes mutual positions of the plurality of planetary gear shafts 22A. The planetary gear carrier main body 23A includes a planetary gear output side arm portion 24A and a planetary gear input side arm portion 26A.

The planetary gear output side arm portion 24A rotatably supports the end portion on the output side in the axial direction of the plurality of planetary gear shafts 22A. The planetary gear input side arm portion 26A rotatably supports the end portion on the input side in the axial direction of the plurality of planetary gear shafts 22A. In this manner, by supporting the planetary gear shaft 22A via the planetary gear carrier main body 23A, the planetary gear carrier 21A coaxially supports the first planetary gear 151A and the second planetary gear 152A.

The planetary gear carrier shaft 27A fixes the planetary gear carrier main body 23A. The planetary gear carrier shaft 27A extends in the axial direction around the axis line Ar. The planetary gear carrier shaft 27A includes an output side planetary gear carrier shaft 27Ao which extends from the planetary gear output side arm portion 24A to the output side, and an input side planetary gear carrier shaft 27Ai which extends from the planetary gear input side arm portion 26A to the input side. Both the output side planetary gear carrier shaft 27Ao and the input side planetary gear carrier shaft 27Ai form a cylindrical shape around the axis line Ar.

The output side planetary gear carrier shaft 27Ao is supported by the planetary gear carrier bearing 43 so as to be rotatable around the axis line Ar with respect to the transmission device casing 41. In the planetary gear carrier bearing 43, the sun gear shaft 12 is inserted into the inner circumferential side of the output side planetary gear carrier shaft 27Ao disposed further on the output side than the planetary gear output side arm portion 24A.

The input side planetary gear carrier shaft 27Ai is supported by the planetary gear carrier bearing 44 so as to be rotatable around the axis line Ar with respect to the transmission device casing 41. The planetary gear carrier bearing 44 is disposed closer to the input side than the planetary gear input side arm portion 26A. An external gear carrier shaft 37A which will be described later is inserted into the inner circumferential side of the input side planetary gear carrier shaft 27Ai.

The external gear carrier 31A supports the external gear 17A to be rotatable around the axis line Ar. The external gear carrier 31A includes the external gear carrier shaft 37A connected to the external gear 17A.

The external gear carrier shaft 37A is fixed to the external gear 17A and extends in the axial direction around the axis line Ar. The external gear carrier shaft 37A forms a columnar shape around the axis line Ar. The external gear carrier shaft 37A extends from the external gear 17A to the input side in the axial direction. The input side part of the external gear carrier shaft 37A is inserted into the inner circumferential side of the cylindrical input side planetary gear carrier shaft 27Ai.

According to the variable-speed accelerator 1 including the transmission device 10A described above, similarly to the first embodiment, by transmitting the driving force of the variable-speed rotor 72 to the constant-speed rotor 52, it is possible to reduce the load of the constant-speed electric motor 51 including the constant-speed rotor 52. Accordingly, it is possible to smooth the start of the variable-speed accelerator 1.

In addition, the gear which meshes with the planetary gears 15 and 15A may be either the internal gear 17 as in the first embodiment or the external gear 17A as in the third embodiment, but the number thereof is not limited to the configuration of the embodiment. Therefore, for example, the gear which meshes with the planetary gear 15 may be configured to have two or more internal gears 17 as in the first embodiment. In addition, the gear which meshes with the planetary gear 15A may be configured to have only one or three or more external gears 17A as in the third embodiment.

In addition, the variable-speed input shaft Av of the transmission device 10 and the variable-speed rotor 72 of the electric device 50 are not limited to being coaxially connected as in the present embodiment. For example, the variable-speed rotor 72 may be connected to the variable-speed input shaft Av via a connection structure, such as another gear. Therefore, the variable-speed accelerator 1 of the present embodiment is not limited to a structure in which one variable-speed electric motor 71 is connected to one transmission device 10. For example, a plurality of variable-speed rotor s 72 may be connected to one variable-speed input shaft Av such that a plurality of variable-speed electric motors 71 are connected to one transmission device 10.

Although the embodiments of the present invention have been described in detail above, various modifications can be made without departing from the technical idea of the present invention.

REFERENCE SIGNS LIST

1 VARIABLE-SPEED ACCELERATOR
2 CLUTCH
10, 10A TRANSMISSION DEVICE
11 SUN GEAR
12 SUN GEAR SHAFT
15, 15A PLANETARY GEAR
17 INTERNAL GEAR (GEAR)
21, 21A PLANETARY GEAR CARRIER
22, 22A PLANETARY GEAR SHAFT
23, 23A PLANETARY GEAR CARRIER MAIN BODY
27, 27A PLANETARY GEAR CARRIER SHAFT
271, 27AI INPUT SIDE PLANETARY GEAR CARRIER SHAFT
270, 27AO OUTPUT SIDE PLANETARY GEAR CARRIER SHAFT
31 INTERNAL GEAR CARRIER (GEAR CARRIER)
37 INTERNAL GEAR CARRIER SHAFT (GEAR CARRIER SHAFT)
41 TRANSMISSION DEVICE CASING
42 SUN GEAR BEARING
43, 44 PLANETARY GEAR CARRIER BEARING
50 ELECTRIC DEVICE
51 CONSTANT-SPEED ELECTRIC MOTOR
52 CONSTANT-SPEED ROTOR
53 CONSTANT-SPEED ROTOR SHAFT
56 CONDUCTOR
61 CONSTANT-SPEED ELECTRIC MOTOR CASING
66 CONSTANT-SPEED STATOR
71 VARIABLE-SPEED ELECTRIC MOTOR
72 VARIABLE-SPEED ROTOR
73 VARIABLE-SPEED ROTOR SHAFT
74 SHAFT INSERTION HOLE
76 CONDUCTOR
81 VARIABLE-SPEED ELECTRIC MOTOR CASING
86 VARIABLE-SPEED STATOR
100 ROTATIONAL SPEED CONTROL DEVICE
101 FREQUENCY CONVERSION UNIT
102 ROTATIONAL DIRECTION CHANGING UNIT
110 POWER SOURCE LINE
111 VARIABLE-SPEED ELECTRIC MOTOR SWITCH
112 CONSTANT-SPEED ELECTRIC MOTOR SWITCH
120 CONTROL UNIT
121 ACCEPTANCE UNIT
122 INTERFACE
123 OPERATION UNIT
AC CONSTANT-SPEED INPUT SHAFT
AO OUTPUT SHAFT
AR AXIS LINE
AV VARIABLE-SPEED INPUT SHAFT
C COMPRESSOR
R1 FIRST DIRECTION
R2 SECOND DIRECTION
17A EXTERNAL GEAR (GEAR)
31A EXTERNAL GEAR CARRIER (GEAR CARRIER)
37A EXTERNAL GEAR CARRIER SHAFT (GEAR CARRIER SHAFT)
24A PLANETARY GEAR OUTPUT SIDE ARM PORTION
26A PLANETARY GEAR INPUT SIDE ARM PORTION
151A FIRST PLANETARY GEAR (PRIMARY GEAR)
152A SECOND PLANETARY GEAR (SECONDARY GEAR)
10S TRANSMISSION DEVICE SUPPORT UNIT
50S ELECTRIC DEVICE SUPPORT UNIT
64 OPENINGS
84 OPENINGS
Ap CENTER LINE

What is claimed is:

1. A variable-speed accelerator comprising:
a clutch;
an electric device which is configured to generate a rotational driving force; and
a planetary gear transmission device which is configured to change a speed of the rotational driving force transmitted from the electric device to a constant-speed input shaft and a variable-speed input shaft and transmits the rotational driving force to a driving target via an output shaft, wherein
the electric device includes
a constant-speed electric motor including a constant-speed rotor which is configured to rotate the constant-speed input shaft of the planetary gear transmission device in a second direction, and
a variable-speed electric motor which includes a variable-speed rotor connected to the variable-speed input shaft of the planetary gear transmission device, which functions as a generator in a generator mode, which functions as an electric motor in an electric motor mode, and which is configured to rotate the output shaft at a maximum rotational speed by rotating the variable-speed rotor at the maximum rotational speed in a first direction, and
once the rotational speed of the variable-speed rotor in the second direction exceeds the rotational speed of the constant-speed rotor in the second direction, the clutch connects the variable-speed rotor to the constant-speed rotor and transmits a driving force of the variable-speed rotor to the constant-speed rotor.

2. The variable-speed accelerator according to claim 1, wherein the planetary gear transmission device includes
a sun gear which is configured to rotate around an axis line,
a sun gear shaft which is fixed to the sun gear and extends in an axial direction around the axis line,
a planetary gear which is configured to mesh with the sun gear, to revolve around the axis line, and to rotate around a center of the planetary gear,
a gear of which a plurality of teeth are arranged in an annular shape around the axis line, and which is configured to mesh with the planetary gears,
a planetary gear carrier which has a planetary gear carrier shaft that extends in the axial direction around the axis line and supports the planetary gear to be capable of revolving around the axis line and to be rotatable around the center of the planetary gear, and
a gear carrier which has a gear carrier shaft that extends in the axial direction around the axis line and supports the gear to be rotatable around the axis line,
wherein the sun gear shaft forms the output shaft connected to the driving target, the gear carrier shaft forms the constant-speed input shaft, and the planetary gear carrier shaft forms the variable-speed input shaft, and
wherein the variable-speed rotor is formed in a cylindrical shape around the axis line, which is connected to the variable-speed input shaft of the planetary gear transmission device, and the constant-speed input shaft is inserted into a shaft insertion hole that penetrates the variable-speed rotor in the axial direction.

3. The variable-speed accelerator according to claim 2, wherein the gear is an internal gear, and
wherein the gear carrier shaft is an internal gear carrier shaft.

4. The variable-speed accelerator according to claim 2, wherein the gear is an external gear,
wherein the gear carrier shaft is an external gear carrier shaft,
wherein the planetary gear includes a primary gear which meshes with the external gear and a secondary gear which meshes with the sun gear, and
wherein the planetary gear carrier coaxially supports the primary gear and the secondary gear.

5. A method for starting the variable-speed accelerator according to claim 1, the method comprising:
activating only the variable-speed electric motor in the second direction in the electric motor mode; and
activating the constant-speed electric motor at a stage where the rotational speed of the constant-speed rotor reaches a rated rotational speed.

6. A method for starting a variable-speed accelerator including a clutch, an electric device which is configured to generate a rotational driving force, and a planetary gear transmission device which is configured to change a speed of the rotational driving force transmitted from the electric device to a constant-speed input shaft and a variable-speed input shaft and transmits the rotational driving force to a driving target via an output shaft, wherein the electric device includes a constant-speed electric motor including a constant-speed rotor which is configured to rotate the constant-speed input shaft of the planetary gear transmission device in a second direction, and a variable-speed electric motor which includes a variable-speed rotor connected to the variable-speed input shaft of the planetary gear transmission device, which functions as a generator in a generator mode, which functions as an electric motor in an electric motor mode, and which is configured to rotate the output shaft at a maximum rotational speed by rotating the variable-speed rotor at the maximum rotational speed in a first direction, and wherein the clutch connects the variable-speed rotor and the constant-speed rotor and transmits a driving force of the constant-speed rotor to the variable-speed rotor is provided, the method comprising:
activating only the constant-speed electric motor;
activating the variable-speed electric motor at a stage where the constant-speed electric motor reaches a rated rotational speed; and
once the rotational speed of the variable-speed rotor in the second direction exceeds the rotational speed of the constant-speed rotor in the second direction, connecting the clutch to the variable-speed rotor to the constant-speed rotor and transmitting the driving force of the variable-speed rotor to the constant-speed rotor.

7. The method for starting the variable-speed accelerator according to claim 6,
wherein the planetary gear transmission device includes
a sun gear which is configured to rotate around an axis line,
a sun gear shaft which is fixed to the sun gear and extends in an axial direction around the axis line,
a planetary gear which is configured to mesh with the sun gear, to revolve around the axis line, and to rotate around a center of the planetary gear,
a gear of which a plurality of teeth are arranged in an annular shape around the axis line, and which is configured to mesh with the planetary gears,
a planetary gear carrier which has a planetary gear carrier shaft that extends in the axial direction around the axis line and supports the planetary gear to be capable of revolving around the axis line and to be rotatable around the center of the planetary gear, and
a gear carrier which has a gear carrier shaft that extends in the axial direction around the axis line and supports the gear to be rotatable around the axis line,
wherein the sun gear shaft forms the output shaft connected to the driving target, the gear carrier shaft forms the constant-speed input shaft, and the planetary gear carrier shaft forms the variable-speed input shaft, and
wherein the variable-speed rotor is formed in a cylindrical shape around the axis line, which is connected to the variable-speed input shaft of the planetary gear transmission device, and the constant-speed input shaft is inserted into a shaft insertion hole that penetrates the variable-speed rotor in the axial direction.

8. The method for starting the variable-speed accelerator according to claim 7,
wherein the gear is an internal gear, and
wherein the gear carrier shaft is an internal gear carrier shaft.

9. The method for starting the variable-speed accelerator according to claim 7,
wherein the gear is an external gear,
wherein the gear carrier shaft is an external gear carrier shaft,
wherein the planetary gear includes a primary gear which meshes with the external gear and a secondary gear which meshes with the sun gear, and
wherein the planetary gear carrier coaxially supports the primary gear and the secondary gear.

* * * * *